United States Patent [19]

Abe et al.

[11] Patent Number: 5,484,824
[45] Date of Patent: Jan. 16, 1996

[54] THERMOPLASTIC POLYPROPYLENE RESIN COMPOSITION

[75] Inventors: Hiroomi Abe, Chiba; Takeshi Fujii, Sodegaura; Masashi Yamamoto, Niihama; Takeyoshi Nishio, Okazaki; Takao Nomura, Toyota, all of Japan

[73] Assignees: Sumitomo Chemical Company, Limited, Osaka; Toyota Jidosha Kabushiki Kaisha, Toyota, both of Japan

[21] Appl. No.: 448,188

[22] Filed: May 23, 1995

Related U.S. Application Data

[63] Continuation of Ser. No. 92,449, Jul. 14, 1993, abandoned.

[30] Foreign Application Priority Data

Jul. 15, 1992 [JP] Japan ..................... 4-188041

[51] Int. Cl.$^6$ .............. C08K 3/36; C08L 23/16; C08L 23/08; C08L 53/00
[52] U.S. Cl. .............. 523/436; 523/437; 525/64; 525/71; 525/74; 525/92 F; 525/108
[58] Field of Search ................... 523/436, 437; 525/64, 71, 74, 92 F, 108

[56] References Cited

U.S. PATENT DOCUMENTS

| | | | |
|---|---|---|---|
| 4,480,065 | 10/1984 | Kawai et al. | |
| 4,748,206 | 5/1988 | Nogiwa et al. | |
| 4,764,404 | 8/1988 | Genske et al. | |
| 4,981,896 | 1/1991 | Okada et al. | 525/64 |
| 5,004,782 | 4/1991 | Mashita et al. | 525/64 |
| 5,093,404 | 3/1992 | Okada et al. | 525/64 |
| 5,095,063 | 3/1992 | Okada | 525/64 |
| 5,278,233 | 1/1994 | Abe | 525/64 |

FOREIGN PATENT DOCUMENTS

| | | | |
|---|---|---|---|
| 0336320 | 10/1989 | European Pat. Off. . | |
| 0337214 | 10/1989 | European Pat. Off. | 525/64 |
| 0498907 | 8/1992 | European Pat. Off. . | |
| 51-136735 | 11/1976 | Japan . | |
| 58-17140 | 2/1983 | Japan . | |
| 59-98157 | 6/1984 | Japan . | |
| 1204946 | 8/1989 | Japan . | |
| 4153243 | 5/1992 | Japan . | |
| 1557376 | 12/1979 | United Kingdom . | |
| 9001519 | 2/1990 | WIPO . | |

OTHER PUBLICATIONS

*Catalogue of Ethylene/Alpha–Olefin Copolymer Tafmer A/P* by Mitsui Petrochemical Industries, Ltd.

*Primary Examiner*—John C. Bleutge
*Assistant Examiner*—D. R. Wilson
*Attorney, Agent, or Firm*—Stevens, Davis, Miller & Mosher

[57] ABSTRACT

A thermoplastic resin composition which contains a resin composition containing a crystalline polypropylene component, an ethylene-butene-1 copolymer rubber and an ethylene-propylene copolymer rubber; a modified polypropylene; a saturated polyester resin; and an epoxy group-containing copolymer; and optionally talc exhibits high low-temperature impact strength, stiffness and Rockwell hardness and a small coefficient of linear expansion, which composition gives an injection-molded article suitably used for a bumper for automobile.

4 Claims, 1 Drawing Sheet

THERMOPLASTIC POLYPROPYLENE RESIN COMPOSITION

This application is a continuation of application Ser. No. 08/092,449, filed Jul. 14, 1993, now abandoned.

The present invention relates to a novel thermoplastic resin composition which is excellent in physical properties such as stiffness, low-temperature impact resistance and scratch resistance, shows a good molding processability such as a short molding cycle, and is characterized by such a high surface quality that neither formation of regular and linear depressions and protuberances and flow marks, nor surface distortion is caused; and an injection-molded article, in particular, a bumper for automobile, which has an excellent dimensional stability and is obtained by molding said composition by an injection molding method.

More particularly, the present invention relates to a novel thermoplastic resin composition comprising a specific crystalline polypropylene as its main constituent, a specific ethylene-butene-1 copolymer rubber, a specific ethylene-propylene copolymer rubber, a modified polypropylene, a saturated polyester resin, an epoxy group-containing copolymer and optionally talc, which composition is excellent in physical properties such as stiffness, low-temperature impact resistance and scratch resistance, shows a good injection molding processability such as a short molding cycle, and has a high surface quality; and an injection-molded article, in particular, a bumper for automobile, which has an excellent dimensional stability and is obtained by molding said composition by an injection molding method.

For weight reduction, safety, etc., bumpers made of a polyurethane and bumpers made of a crystalline propylene-ethylene block copolymer have recently begun to be used as bumpers for automobile in place of iron bumpers. However, the polyurethane bumpers are expensive and have a relatively high specific gravity. The bumpers made of a crystalline propylene-ethylene block copolymer are excellent in thermal properties such as stiffness and thermal deformation temperature but are not satisfactory in impact strength at low temperatures.

For improving the low-temperature impact strength, JP-A-53-22552 and JP-A-53-40045, for example, have proposed blending of an ethylene-propylene copolymer rubber with a crystalline propylene-ethylene block copolymer. The blending of an ethylene-propylene copolymer rubber, however, deteriorates the thermal properties such as stiffness and thermal deformation temperature. For solving this problem, JP-A-51-136735, JP-A-53-64256, JP-A-53-64257, JP-A-57-55952, JP-A-57- 207630, JP-A-58-17139, JP-A-58-111846, JP-A-59-98157 and JP-B-55-3374, for example, have proposed blending of an inorganic filler such as calcium carbonate, barium sulfate, mica, crystalline calcium silicate, or talc with the above two components. Of these references, JP-A-57- 55952, JP-A-57-207630, JP-A-58-111846 and JP-A-59-98157 disclose compositions for bumpers. JP-A-51-136735 discloses that blending of talc permits further reduction of the mold shrinkage factor and improvement of the dimensional stability. JP-A-57-207630 discloses that blending of talc, mica or calcium silicate also brings about these effects.

JP-A-58-17139 and JP-A-17140 have proposed blending an ethylene-butene-1 copolymer rubber with a crystalline propylene-ethylene block copolymer in place of the ethylene-propylene copolymer rubber. In particular, JP-A-58-17140 discloses that employment of an ethylene-butene-1 copolymer rubber reduces a whitened area formed by impact and improves the scratch resistance as compared with employment of the ethylene-propylene copolymer rubber.

Compositions comprising a crystalline propylene-ethylene copolymer, an ethylene-propylene copolymer rubber and talc (hereinafter abbreviated as "ethylene-propylene copolymer rubber composition") are widely used for producing bumpers, for example, because they are not expensive and have a good moldability though they are not sufficient in scratch resistance. Reinforced RIM-urethane has recently come to be used in place of said compositions because there is a problem of recycling resources.

The ethylene-propylene copolymer rubber composition is molded into a bumper usually by injection molding. With respect to the injection molding processability, the composition should satisfy the following requirements. First, the molding cycle of the composition should be able to be reduced for improving the productivity. Secondly, when injection-molded, the composition should be able to give a bumper, a molded product, which has an excellent surface quality equal to that of a reinforced RIM-urethane bumper, namely, which does not show formation of regular and linear depressions and protuberances and flow marks, and surface distortion. On the other hand, the bumper is required to look like one with the body of an automobile as a part of the decorative design of the automobile. Therefore, a resin material for the bumper is required to have a dimensional stability similar to that of iron used in the body.

Conventional ethylene-propylene copolymer rubber compositions, however, have a limited scratch resistance and are not sufficient in dimensional stability. Moreover, they involve the following problems. When their fluidity is merely increased, the surface quality is improved in injection molding, but no sufficient low-temperature impact strength required of a bumper can be attained. On the other hand, the charging time can be reduced, but the plasticization time is increased, so that the molding cycle time is not reduced.

In view of such conditions, the present invention is intended to provide a thermoplastic resin composition which comprises a crystalline polypropylene as its main constituent, has satisfactory physical properties such as high low-temperature impact resistance and stiffness required of a bumper, and a Rockwell hardness higher than that of conventional ethylene-propylene copolymer rubber compositions, shows a good injection molding processability such as a short molding cycle, and has a good surface quality; and an injection-molded article, in particular, a bumper, which has a small coefficient of linear expansion, by the use of said composition.

According to the present invention, there are provided a thermoplastic resin composition which comprises:

100 parts by weight of a resin composition (D) comprising:
  not less than 50% by weight of a crystalline polypropylene component (A),
  10 to 25% by weight of an ethylene-butene-1 copolymer rubber (B), and
  10 to 25% by weight of an ethylene-propylene copolymer rubber (C);
0.1 to 5.0 parts by weight of a modified polypropylene (E);
0.005 to 5 parts by weight of a saturated polyester resin (F); and
0.1 to 5.0 parts by weight of an epoxy group-containing copolymer (G);
the crystalline polypropylene component (A) being selected from the group consisting of:

(i) crystalline propylene-ethylene block copolymers comprising:

propylene homopolymer portions as the first segment which have a Q value of 5 or less as determined by gel permeation chromatography and an intrinsic viscosity of 0.85 to 0.95 dl/g as determined at 135° C. using tetralin as a solvent, and propylene-ethylene random copolymer portions as the second segment which have a calculated viscosity parameter of 4.5 to 5.5 dl/g as defined hereinafter and a weight ratio of the propylene units to the ethylene units of 75:25 to 60:40, and (ii) mixtures of a crystalline propylene-ethylene block copolymer comprising:

propylene homopolymer portions as the first segment which have a Q value of 5 or less as determined by gel permeation chromatography and an intrinsic viscosity of 0.85 to 0.95 dl/g as determined at 135° C. using tetralin as a solvent, and propylene-ethylene random copolymer portions as the second segment which have a calculated viscosity parameter of 4.5 to 5.5 dl/g as defined hereinafter and a weight ratio of the propylene units to the ethylene units of 75:25 to 60:40; and a crystalline propylene homopolymer having a Q value of 5 or less as determined by gel permeation chromatography and an intrinsic viscosity of 0.85 to 0.95 dl/g as determined at 135° C. using tetralin as a solvent, the ethylene-butene-1 copolymer rubber (B) having a Q value of 2.7 or less as determined by gel permeation chromatography, a content of butene-1 unit of from 15 to 20% by weight, an intrinsic viscosity of from 1.1 to 2.1 dl/g as determined at 70° C. using xylene as a solvent, and a Mooney viscosity at 100° C., $ML_{1+4}$ 100, of from 7 to 90, the ethylene-propylene copolymer rubber (C) having a Q value of 2.7 or less as determined by gel permeation chromatography, a content of propylene unit of from 20 to 30% by weight, an intrinsic viscosity of from 1.8 to 2.2 dl/g as determined at 70° C. using xylene as a solvent, and a Mooney viscosity at 100° C., $ML_{1+4}$ 100, of from 35 to 100, the resin composition (D) satisfying the following mathematical expressions (1) to (5):

$$A+B+C=100 \tag{1}$$

$$B+C \geq 30 \tag{2}$$

$$0.3 \leq (A'+B+C)/100 \leq 0.55 \tag{3}$$

$$0.1 \leq A'/(A'+B+C) \tag{4}$$

$$0.4 \leq B/(B+C) \leq 0.6 \tag{5}$$

wherein A, B and C are the weight percentages of the crystalline polypropylene component (A), the ethylene-butene-1 copolymer rubber (B) and the ethylene-propylene copolymer rubber (C) in the resin composition (D), respectively; and A' is the weight percentage of the second segment in the crystalline polypropylene component (A), and the mixture of the crystalline polypropylene component (A), the ethylene-butene-1 copolymer rubber (B), the ethylene-propylene copolymer rubber (C), the modified polypropylene (E), the saturated polyester resin (F) and the epoxy group-containing copolymer (G) having a melt flow rate determined at 230° C. under a load of 2.16 kg using an orifice having a diameter of 2.095 mm, and a length of 8.000 mm, of from 15 to 25 g/10 min. and a flexural modulus at 23° C. of from 3,000 to 25,000 $kg/cm^2$;

a thermoplastic resin composition which meets the above requirements and further comprises 1 to 22 parts by weight of talc (H) having an average particle diameter of 4 μm or less, wherein the mixture of the crystalline polypropylene component (A), the ethylene-butene-1 copolymer rubber (B), the ethylene-propylene copolymer rubber (C), the modified polypropylene (E), the saturated polyester resin (F), the epoxy group-containing copolymer (G) and the talc (H) has a melt flow rate determined at 230° C. under a load of 2.16 kg using the orifice mentioned above of from 15 to 25 g/10 min. and a flexural modulus at 23° C. of from 3,000 to 25,000 $kg/cm^2$;

an article obtained by injection molding any one of the thermoplastic resin compositions; and a bumper obtained by injection molding any one of the thermoplastic resin compositions.

Figure 1:
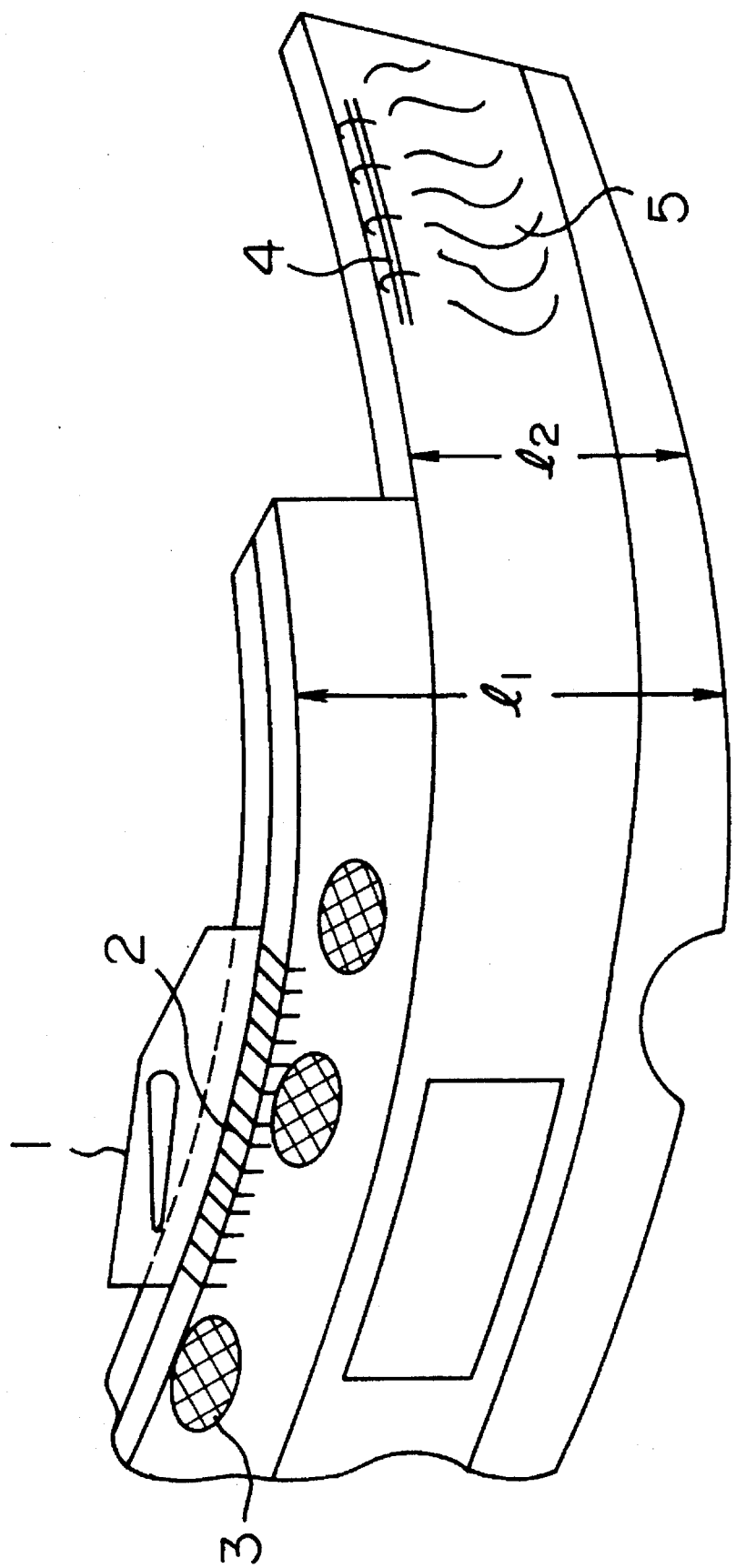
FIG. 1 is a perspective view of a part of a bumper obtained by injection molding.

1 shows a gate portion, 2 regular and linear depressions and protuberances formed in the direction of flow near the gate, 3 a gate distortion, 4 an end distortion, 5 flow marks, $l_1$ a width of the bumper, and $l_2$ another width of the bumper.

In the present specification, the crystalline polypropylene refers to crystalline propylene homopolymers and crystalline propylene-α-olefin block copolymers which comprises as the first segment prepared in the first step of the polymerization, crystalline propylene homopolymer portions or crystalline propylene-α-olefin random copolymer portions obtained from propylene and at least one α-olefin monomer selected from ethylene and α-olefins other than ethylene (e.g. butene-1 and hexene-1), wherein the content of the α-olefin monomer unit is 6 mole % or less based on the total moles of the monomer units in the polymer produced in the first step, and which comprises as the second segment prepared in the second step of the polymerization, propylene-α-olefin random copolymer portions obtained from propylene and at least one α-olefin monomer selected from ethylene and α-olefins other than ethylene (e.g. butene-1 and hexene-1), wherein the content of the α-olefin monomer unit is 10 mole % or more based on the total moles of the monomer units in the polymer produced in the second step of the polymerization. Of the crystalline polypropylenes thus defined, a crystalline propylene-ethylene block copolymer comprising crystalline propylene homopolymer portions prepared as the first segment in the first step of the polymerization and propylene-ethylene random copolymer portions prepared as the second segment in the second step of the polymerization, or a mixture of such a crystalline propylene-ethylene block copolymer and a crystalline propylene homopolymer is referred to as crystalline polypropylene component (A).

The crystalline polypropylene can be obtained, for example, by reacting the starting materials in the presence of a chemical complex of a titanium trichloride and an alkylalminum compound which is usually called Ziegler-Natta catalyst.

The polymerization can be carried out at 0° to 300° C. However, preferably, the polymerization is carried out usually in the range of 0° to 100° C., for example because above 100° C., highly stereoregular polymerization of an α-olefin such as propylene becomes difficult to yield a polymer having a high stereo-regularity.

Although the polymerization pressure is not critical, it is preferably 3 to 100 atmospheres because such a pressure is industrial and economical.

It is also possible to add a chain transfer agent such as hydrogen in order to control the molecular weight of polymer.

The polymerization can be carried out by a continuous process or a batch process.

As a method for the polymerization, there can be employed slurry polymerization using an inert hydrocarbon solvent such as butane, pentane, hexane, heptane, or octane; solution polymerization in which the produced polymer is dissolved in the inert hydrocarbon solvent mentioned above; bulk polymerization in which a liquid monomer is polymerized without solvent; and gas phase polymerization in which a gaseous monomer is polymerized.

The polypropylene used for producing some of the components contained in the thermoplastic resin composition of this invention can be produced using an isospecific Ziegler-Natta catalyst. The catalyst used herein is preferably one which has a high isospecificity.

Catalysts which can be suitably used are those containing titanium trichloride having a layer crystal structure or a solid complex of a magnesium compound and a titanium compound as the transition metal constituent and an organoaluminum compound as the typical metal constituent. The catalyst may further contain a well-known electron donative compound as the third component.

Titanium trichloride used can be prepared by reducing titanium tetrachloride with a reducing agent of wide variety. As the reducing agent, metals such as aluminum and titanium, hydrogen, organometal compounds, etc. are known. A typical example of titanium trichloride produced through metal reduction is titanium trichloride composition ($TiCl_3AA$) which is prepared by reducing titanium tetrachloride with metallic aluminum and then pulverizing the reduction product by means of a ball mill of a vibration mill. Owing to the above process, the $TiCl_3AA$ contains activated aluminum chlorides. For improving the isospecificity, polymerization activity and/or particle shape of the $TiCl_3AA$, a compound selected from the group consisting of ether, ketones, esters, aluminum chloride, titanium chloride, etc. may be added during the pulverization.

Titanium trichloride more preferable for the object of this invention is one which is obtained by reducing titanium tetrachloride with an organoaluminum compound, and subjecting the resulting titanium trichloride composition to catalytic reaction with an ether compound and an halogen compound successively or at the same time. As the ether compound, those having the formula $R^1$—O—$R^2$ (each of $R^1$ and $R^2$ is an alkyl group having 1 to 18 carbon atoms), in particular, di-n-butyl ether and di-t-amyl ether, are preferable. The halogen compound is preferably selected from the group consisting of halogens, in particular, iodine; halogen compounds, in particular, iodine trichloride; titanium halides, in particular, titanium tetrachloride; and halogenated hydrocarbons, in particular, carbon tetrachloride and 1,2-dichloroethane. As the organoaluminum compound, those represented by the formula $AlR^3{}_nX_{3-n}$ ($R^3$ is a hydrocarbon group having 1 to 18 carbon atoms, X is a halogen selected from Cl, Br and I, and n is an integer satisfying the inequality $3 \geq n > 1$), in particular, diethylaluminum chloride and ethylaluminum sesquichloride, are preferable.

Processes for producing such titanium trichloride as mentioned above are disclosed in detail in JP-A-47-34470, JP-A-53-33289, JP-A-53-51285, JP-A-54-11986, JP-A-58-142903, JP-A-60-28405, JP-A-60-228504, etc.

When titanium trichloride having a layer crystal structure is used as the transition metal compound component, organoaluminum compounds represented by the formula $AlR^4{}_mX_{3-m}$ ($R^4$ is a hydrocarbon group having 1 to 18 carbon atoms, X is a halogen selected from Cl, Br and I, and m is a number in the range $3 \geq m > 0$) are preferable as the typical metal compound component. Organoaluminum compounds particularly preferable for the object of this invention are compounds in which $R^4$ is an ethyl or isobutyl group, and m is a number in the range $2.5 \geq m \geq 1.5$. Specific examples of such compounds are diethylaluminum chloride, diethylaluminum bromide, diethylaluminum iodide, and mixtures of these compounds and triethylaluminum or ethylaluminum dichloride. When the third component described later is co-used, organoaluminum compounds in which m is a number in the range $3 \geq m \geq 2.5$ or $1.5 \geq m > 0$ can be suitably used for the object of this invention.

The molar ratio of the organoaluminum compound to the titanium trichloride falls within a wide range of 1–1,000:1.

The catalyst comprising titanium trichloride and the organoaluminum compound may further contain the third component which is well known. Specific examples of the third component are ε-caprolactam; ester compounds such as methyl methacrylate, ethyl benzoate, methyl toluate and the like; phosphorus acid esters such as triphenyl phosphite, tributyl phosphite, and the like; and the phosphoric acid derivatives such as hexamethylphosphoric triamide, and the like.

The amount used of the third component is usually equimolar with or smaller than the amount of the organoaluminum compound.

When a solid complex of a magnesium compound and a titanium compound is used as the transition metal solid component of the catalyst, organoaluminum compounds, in particular, compounds represented by the formula $AlR^5{}_pX_{3-p}$ ($R^5$ is a hydrocarbon group having 1 to 18 carbon atoms, X is a halogen selected from Cl, Br and I, a hydrogen atom, or an alkoxy group, and p is a number in the range $3 \geq p > 2$), are preferable as the typical metal component of the catalyst. Specific examples of such compounds are triethylaluminum, triisobutylaluminum, and mixtures of these compounds with diethylaluminum chloride or diisobutylaluminum chloride.

It is preferable that the catalyst further contains at least one electron-donating compound, in particular, an aromatic monocarboxylic acid ester and/or a silicon compound having Si—$OR^6$ linkage.

As the silicon compound having Si—$OR^6$ linkage ($R^6$ is a hydrocarbon group having 1 to 20 carbon atoms), preferably used are alkoxysilane compounds represented by the formula $R^7{}_aSi(OR^6)_{4-a}$ (each of $R^6$ and $R^7$ is a hydrocarbon group having 1 to 20 carbon atoms, and a is a number of $0 \geq a \geq 3$). Specific examples of the alkoxysilane compounds are tetramethoxysilane, methyltrimethoxysilane, dimethyldimethoxysilane, ethyltrimethoxysilane, phenyltrimethoxysilane, tetraethoxysilane, methyltriethoxysilane, ethyltriethoxysilane, vinyltriethoxysilane, phenyltriethoxysilane, diphenyldimethoxysilane, diphenyldiethoxysilane, butyltriethoxysilane, tetrabutoxysilane, vinyltributoxysilane, diethyldiethoxysilane, cyclohexylmethyldimethoxysilane, cyclohexyethyldimethoxysilane, t-butylmethyldimethoxysilane, isobutylmethyldimethoxysilane, etc.

The electron-donating compound is used preferably in an amount of 1 mole or less, particularly 0.05 to 1 mole per mole of the organoaluminum compound.

As the solid complex of a magnesium compound and a titanium compound, there is used titanium trichloride containing magnesium chlorides which is obtained by reducing titanium tetrachloride with an organomagnesium compound, or one of the so-called "supported catalyst" prepared by subjecting a solid magnesium compound to catalytic reaction with a liquid titanium compound. Preferably, the solid magnesium compound is a compound containing at least one electron-donating compound, in particular, an aromatic monocarboxylic acid ester, an aromatic dicarboxylic acid diester, an ether compound, an alcohol and/or a phenol. The aromatic monocarboxylic acid ester can be added during the catalytic reaction with a titanium compound.

Such solid complexes of a magnesium compound and a titanium compound are described in many official patent gazettes. Catalysts suitable for the object of this invention are described in detail, for example, in JP-A-54-112988, JP-A-54-119586, JP-A-56-30407, JP-A-57-59909, JP-A-57-59910, JP-A-57-59911, JP-A-57-59912, JP-A-57-59914, JP-A-57-59915, JP-A-57-59916, JP-A-54-112982, JP-A-55-133408, JP-A-58-27704, JP-A-61-218606, JP-A-1-319508, JP-A-1-115909, etc.

When the thermoplastic resin composition of the present invention encounters such requirements as particularly high heat resistance, stiffness, scratch resistance, etc., it is preferable to use a highly crystalline polypropylene having the following properties: an isotactic pentad of boiling heptane insoluble of crystalline propylene homopolymer portion of 0.970 or more, wherein the crystalline propylene homopolymer portion refers to the crystalline propylene homopolymer or the homopolymer portion of crystalline propylene-α-olefin block polymer which has been prepared as the first segment in the first step of the block polymerization process; a boiling heptane soluble of not more than 5.0% by weight; a 20° C. xylene soluble of not more than 2.0% by weight.

The isotactic pentad of boiling heptane insoluble, boiling heptane soluble and 20° C. xylene soluble are determined as follows.

In 500 ml of boiling xylene is completely dissolved 5 g of the crystalline propylene homopolymer portion, and the resulting mixture is cooled to 20° C. and allowed to stand for 4 hours. Then, the mixture is filtered to remove the 20° C. xylene insoluble. The filtrate is concentrated to dryness to evaporate xylene, and the residue is further dried under reduced pressure at 60° C. to obtain a solidified 20° C. xylene soluble. The 20° C. xylene soluble is determined by dividing the dry weight of the solidified 20° C. xylene soluble by the weight of the sample used and it is represented by percent. The above 20° C. xylene insoluble is dried and then extracted with boiling n-heptane in a Soxhlet apparatus for 8 hours. The extraction residue is referred to as boiling heptane insoluble. The boiling heptane soluble is determined by substracting the dry weight of the boiling heptane insoluble from the weight of the sample used (5 g) and dividing the remainder by the weight of the sample used. It is also represented by percent.

Isotactic pentad refers to the fraction of a series of five successive isotactically-sequenced propylene monomer units in the total polymer chain. It is determined based on $^{13}$C-NMR measurements as disclosed in A. Zambelli et al., Macromolecules, 6, 925 (1973). And the NMR absorption peaks are assigned based on the subsequently published Macromolecules, 8, 687 (1975).

Specifically, the isotactic pentad is determined based on the relative ratio of the area of mmmm peaks to the total area of the absorption peaks assigned to methyl carbons. Applying the method to the NPL standard substance CRM No. M19-14 Polypropylene PP/MWD/2 provided by the National Physical Laboratory (United Kingdom) gave an isotactic pentad of 0.944.

The above-mentioned highly crystalline polypropylene can be prepared by any of the methods disclosed in JP-A-60-28405, JP-A-60-228504, JP-A-61- 218606, JP-A-61-287917, JP-A-1-319508, JP-A-1-115909, etc.

When the thermoplastic resin composition of the present invention is used for a purpose wherein an impact resistance is required, it is preferable to use as the crystalline polypropylene a crystalline propylene-α-olefin block copolymer, which contains propylene homopolymer portions or crystalline propylene-α-olefin block copolymer portions prepared in the first step as the first segment and propylene-α-olefin random copolymer portions prepared in the second step of the block polymerization process as the second segment.

The block copolymer can be prepared by slurry polymerization or gas phase polymerization. When said thermoplastic resin composition is used for a purpose wherein a particularly high impact resistance is required, the amount of the second segment should be increased. In this case, the block copolymer is prepared preferably by gas phase polymerization.

Such a polypropylene having a high impact resistance can be prepared, for example, by the gas phase polymerization disclosed in JP-A-61-287917.

The block copolymer has as the first segment, crystalline propylene homopolymer portions or crystalline propylene-α-olefin random copolymer portions wherein the content of monomer units of ethylene and/or at least one α-olefin other than ethylene is 6 mole % or less based on the total moles of the monomer units in the copolymer. Those having crystalline propylene homopolymer portions are preferable.

The block copolymer has as the second segment, propylene-α-olefin random copolymer portions wherein the content of monomer units of ethylene and/or at least one α-olefin other than ethylene is 10 mole % or more based on the total moles of the monomer units in the copolymer. Preferable are those having propylene-α-olefin random copolymer portions of propylene, ethylene and/or an α-olefin having 4 to 6 carbon atoms wherein the content of ethylene units is 10 mole % or more based on the total moles of the monomer units in the copolymer. Particularly preferable are those having propylene-ethylene random copolymer portions having a content of ethylene unit of 10 mole % or more. A combination of crystalline homopolymer portions as the first segment and propylene-ethylene random copolymer portions having a content of ethylene unit of 10 mole % or more as the second segment is particularly preferable. A copolymer having this combination is hereinafter abbreviated as "crystalline propylene-ethylene block copolymer". The content of the second segment is 10 to 70% by weight based on the weight of the crystalline propylene-ethylene block copolymer.

The content of the second segment for easy and stable production ranges from 10 to 30% by weight for slurry polymerization and from 10 to 70% by weight for gas phase polymerization.

In gas phase polymerization, crystalline propylene-α-olefin block copolymers containing a large amount of the second segment can be prepared according to the process disclosed in JP-A-1-98604. Such copolymers are suited for the use wherein an extremely high impact resistance is requested.

Although the intrinsic viscosity of the second segment in tetralin at 135° C. should be changed depending on the production efficiency, physical properties of the product powder, and the intrinsic viscosity of the first segment, it is approximately 3–15 dl/g for slurry polymerization and 1–5 dl/g for gas phase polymerization.

The weight fraction X of the propylene-ethylene random copolymer portions based on the weight of the whole block copolymer can be calculated according to the following equation by measuring the quantity of heat of fusion of the crystals for each of the crystalline propylene homopolymer portion and the whole block copolymer:

$$X = 1 - (\Delta Hf)_T/(\Delta Hf)_P$$

wherein $(\Delta Hf)_T$: the quantity of fusion (cal/g) of the whole block copolymer, $(\Delta Hf)_P$: the quantity of fusion (cal/g) of the crystalline propylene homopolymer portion.

The ethylene content of the propylene-ethylene random copolymer portion can be calculated according to the following equation by measuring the ethylene content of the whole block copolymer as a weight percentage by infrared absorption spectrum method:

$$(C'_2)_{EP} = (C'_2)_T/X$$

wherein $(C'_2)_T$: the ethylene content (wt %) of the whole block copolymer, $(C'_2)_{EP}$: the ethylene content (wt %) of the propylene-ethylene random copolymer portion.

A calculated viscosity parameter $[\eta]_{EP}$ of the propylene-ethylene random copolymer portion is calculated according to the following equation by measuring the intrinsic viscosity of each of the crystalline homopolymer portion and the whole block copolymer:

$$[\eta]_{EP} = [\eta]_T/X - (1/X - 1)[\eta]_P$$

wherein $[\eta]_P$: the intrinsic viscosity (dl/g) of the crystalline propylene homopolymer portion, $[\eta]_T$: the intrinsic viscosity (dl/g) of the whole block copolymer.

The crystalline propylene-ethylene block copolymer used in the thermoplastic resin composition of the present invention is as follows.

In the crystalline propylene-ethylene block copolymer, the Q value (=the ratio of the weight average molecular weight to the number average molecular weight) indicating the molecular weight distribution of the propylene homopolymer portion as the first segment is 5 or less, preferably 4.5 or less as determined by GPC (gel permeation chromatography). When the Q value exceeds 5, no desirable result can be obtained with respect to the relationship between the molding cycle in injection molding and the surface quality. The intrinsic viscosity of the propylene homopolymer portion in tetralin at 135° C. is 0.85 to 0.95 dl/g. When the intrinsic viscosity exceeds 0.95 dl/g, the melt flow of the composition is low, namely, the fluidity is deteriorated, resulting in a long charging time. Therefore, the molding cycle becomes longer and no satisfactory surface quality can be attained. When the intrinsic viscosity is less than 0.85 dl/g, physical properties of the composition are not satisfactory, that is, the tensile elongation and the low-temperature impact strength are low. With respect to the injection moldability, a good surface quality can be attained, but the plasticization time is increased, resulting in a long molding cycle. Therefore, no desirable result can be obtained.

The ethylene content $(C'_2)_{EP}$ (% by weight) of the propylene-ethylene random copolymer portion is preferably 25 to 40% by weight, more preferably 30 to 35% by weight. When the ethylene content is less than 25% by weight or more than 40% by weight, no desirable result can be attained with respect to the low-temperature impact resistance of the composition. The calculated viscosity parameter $[\eta]_{EP}$ (dl/g) of the propylene-ethylene random copolymer portion is preferably 4.5 to 5.5 (dl/g), more preferably 4.8 to 5.3 (dl/g). When the calculated viscosity parameter is less than 4.5 (dl/g), flow marks are formed during injection molding. When the calculated viscosity parameter exceeds 5.5 (dl/g), regular and linear depressions and protuberances are formed near the gate, so that no desirable result can be obtained with respect to the surface quality.

In the present invention, the ethylene-butene-1 copolymer rubber (B) refers to a copolymer rubber obtained by copolymerizing ethylene with butene-1 by the use of one of the so-called Ziegler-Natta catalysts which are usually used production catalysts. As the Ziegler-Natta catalyst, there is used, for example, a combination of an organoaluminum compound and a trivalent to pentavalent vanadium compound soluble in hydrocarbon solvents. As the aluminum compound, there can be used alkylaluminum sesquichloride, trialkylaluminum, dialkylaluminum monochloride, and the mixtures thereof. As the vanadium compound, there can be used, for example, vanadium oxytrichloride, vanadium tetrachloride, and vanadate compound represented by the formula $VO(OR^8)_q X_{3-q}$ ($0 < q \leq 3$, $R^8$ is a straight-chain, branched-chain, or cyclic hydrocarbon having 1 to 10 carbon atoms, and X is a halogen selected from Cl, Br and I).

The number average molecular weight of the ethylene-butene-1 copolymer rubber is preferably such that the rubber can be kneaded in an extruder, and it is usually 10,000 to 100,000. When the molecular weight is too low, handling of the rubber at the time of feeding to an extruder tends to be difficult. When the molecular weight is too high, processing of the rubber tends to be difficult because of a lowering of the fluidity.

The molecular weight distribution of the ethylene-butene-1 copolymer rubber is not critical, and there can usually be used any commercially available copolymer rubbers having various molecular weight distributions, for example, monomodal distribution and bimodal distribution. Ethylene-butene-1-nonconjugated diene copolymer rubbers can also be used. In this case, it is preferable to adjust the nonconjugated diene content of the starting rubber of 7% by weight or less. When the nonconjugated diene content exceeds 7% by weight, gelation takes place during kneading in some cases.

The butene-1 content of the ethylene-butene-1 copolymer rubber is usually 15 to 20% by weight, preferably 16 to 19% by weight, more preferably 17 to 18% by weight. When the butene-1 content is less than 15% by weight, no desirable result can be obtained with respect to the low-temperature impact strength in some cases. When the butene-1 content exceeds 20% by weight, no desirable result can be obtained with respect to the Rockwell hardness in some cases.

The Q value of the ethylene-butene-1 copolymer rubber is 2.7 or less, preferably 2.5 or less, as determined by a GPC method. Its intrinsic viscosity in xylene at 70° C. and Mooney viscosity at 100° C., $ML_{1+4}$ 100, are 1.1 to 2.1 dl/g and 7 to 90, respectively. They are preferably 1.2 to 2.0 dl/g and 10 to 80, respectively. When the Q value exceeds 2.7, the Rockwell hardness is deteriorated. When the intrinsic viscosity in xylene at 70° C. is less than 1.1 dl/g and the Mooney viscosity at 100° C., $ML_{1+4}$ 100, is less than 7, no desirable result can be obtained with respect to the Rockwell hardness and the low-temperature impact strength. When they exceed 2.1 dl/g and 90, respectively, the ethylene-butene-1 copolymer rubber has a bad compatibility with the crystalline polypropylene component (A), so that no desirable result can be obtained with respect to the low-temperature impact strength.

In the present invention, the ethylene-propylene copolymer rubber (C) is produced by copolymerizing ethylene with propylene using one of the so-called Ziegler-Natta catalysts which are usually used production catalysts. As the Ziegler-Natta catalyst, there is used, for example, a combination of an organoaluminum compound and a trivalent to pentavalent vanadium compound soluble in hydrocarbon solvents. As the aluminum compound, there can be used alkylaluminum sesquichloride, trialkylaluminum, dialkylaluminum monochloride, and mixtures thereof. As the vanadium compound, there can be used, for example, vanadium oxytrichloride, vanadium tetrachloride, and vanadate compound represented by the formula $VO(OR^8)_q X_{3-q}$ ($0<q≦3$, $R^8$ is a straight-chain, branched-chain, or cyclic hydrocarbon having 1 to 10 carbon atoms, and X is a halogen selected from Cl, Br and I).

The number average molecular weight of the ethylene-propylene copolymer rubber is preferably such that the rubber can be kneaded in an extruder, and it is usually 10,000 to 100,000. When the molecular weight is too low, handling of the rubber at the time of feeding to an extruder tends to be difficult. When the molecular weight is too high, processing of the rubber tends to be difficult because of a lowering of the fluidity.

The molecular weight distribution of the ethylene-propylene copolymer rubber is not critical, and there can usually be used any commercially available copolymer rubbers having various molecular weight distributions, for example, monomodal distribution and bimodal distribution.

Ethylene-propylene-nonconjugated diene copolymer rubbers can also be used. In this case, it is preferable to adjust the nonconjugated diene content of the starting rubber to 7% by weight of less. When the nonconjugated diene content exceeds 7% by weight, gelation occurs during kneading in some cases. The propylene content of the ethylene-propylene copolymer rubber is usually 20 to 30% by weight, preferably 22 to 28% by weight. When the propylene content is less than 20% by weight, no desirable result can be obtained with respect to the low-temperature impact strength in some cases. When the propylene content exceeds 30% by weight, no desirable result can be obtained with respect to the Rockwell hardness in some cases.

The Q value of the ethylene-propylene copolymer rubber is 2.7 or less, preferably 2.5 or less, as determined by a GPC method. Its intrinsic viscosity in xylene at 70° C. and Mooney viscosity at 100° C., $ML_{1+4}$ 100, are 1.8 to 2.2 dl/g and 35 to 100, respectively. They are preferably 1.9 to 2.1 dl/g and 50 to 90, respectively. When the Q value exceeds 2.7, the Rockwell hardness is deteriorated. When the intrinsic viscosity in xylene at 70° C. is less than 1.8 dl/g and the Mooney viscosity at 100° C. $ML_{1+4}$ 100 is less than 35, no desirable result can be obtained with respect to the Rockwell hardness and the low-temperature impact strength. When they exceed 2.2 dl/g and 100, respectively, the ethylene-propylene copolymer rubber has a bad compatibility with the crystalline polypropylene component (A), so that no desirable result can be obtained with respect to the low-temperature impact strength.

In the present invention, the modified polypropylene (E) can be obtained by graft copolymerizing an unsaturated aromatic monomer and either an unsaturated carboxylic acid or a derivative thereof as graft monomer(s) onto polypropylene, if necessary, in the presence of a free-radical initiator.

Here, the polypropylene includes propylene homopolymers, propylene-ethylene/α-olefin block copolymers, and propylene-α-olefin random copolymers.

This graft modification of a polypropylene in the presence of an unsaturated aromatic monomer yields a modified polypropylene (E) which has a large amount of the unsaturated carboxylic acid or derivative thereof grafted, a fluidity (a melt flow rate) after the graft modification slightly changed from that before the graft modification, and excellent physical properties.

For grafting the graft monomer(s) on a polypropylene, various conventional methods can be employed.

There can be employed, for example, a method comprising mixing polypropylene, graft monomer(s) and a radical generating agent followed by melt-kneading the resulting mixture in a melt-kneading apparatus to graft the graft monomer(s); a method comprising dissolving polypropylene in an organic solvent such as xylene, adding there to a radical generating agent under nitrogen, carrying out the reaction with heating and stirring, thereafter cooling the reaction mixture, followed by washing filtration, and drying, and thereby obtaining a graft polypropylene; a method comprising irradiating polypropylene with ultraviolet light or radiation in the presence of graft monomer(s); and a method comprising bringing polypropylene into contact with oxygen or ozone in the presence of graft monomer(s).

In consideration of economical efficiency and the like, it is most preferable to employ the method comprising melt-kneading in a melt-kneading apparatus and thereby carrying out graft copolymerization.

A polypropylene can be melt-kneaded with an unsaturated carboxylic acid or a derivative thereof, an unsaturated aromatic monomer and if necessary, a free-radical initiator at a temperature of 150° to 300° C., preferably 190° to 280° C. for a residence time of 0.3 to 10 minutes, preferably 0.5 to 5 minutes by means of an extruder, Banbury mixer, kneader, etc. It is industrially advantageous to employ a method in which a modified polypropylene is continuously produced by a single- or twin-screw extruder while keeping the vent holes vacuous and while removing unreacted components (unsaturated carboxylic acid or derivative thereof, unsaturated aromatic monomer, free-radical initiator, etc.), by-products such as oligomers and decomposition products of these components. Although the reaction may be carried out in air, it is preferably carried out in an inert gas such as nitrogen or carbon dioxide. It is also possible to subject the modified polypropylene obtained to heat treatment at a temperature of 60° C. or higher, solvent extraction, and drawing a vacuum with melting.

If necessary, to the modified polypropylene (E) can be added antioxidants, heat stabilizers, light stabilizers, nucleating agents, lubricants, antistatic agents, inorganic or organic colorants, rust preventives, crosslinking agents, foaming agents, plastisizers, fluorescent agents, surface treating agents, surface brighteners, etc. during the modification or the after-treatment.

The unsaturated carboxylic acid used in the modified polypropylene (E) includes, for example, acrylic acid, methacrylic acid, maleic acid, itaconic acid, citraconic acid, bicyclo[2,2,1]hepta-5-ene-2,3-dicarboxylic acid (himic acid), bicyclo[2,2,2]octa-5-en-2,3-dicarboxylic acid, 4-methylcyclohexa-4-en-1,2-dicarboxylic acid, 1,2,3,4,5,8,9,10-octahydronaphthalen-2,3-dicarboxylic acid, bicyclo[2,2,1]octa-7-en-2,3,5,6-tetracarboxylic acid, 7-oxabicyclo[2,2,1]hepta-5-en-2,3-dicarboxylic acid and the like. The derivatives thereof are acid anhydride, esters, amides, imides and metal salts. Specific examples thereof are maleic anhydride, itaconic anhydride, citraconic anhydride, bicyclo[2,2,1]-hepta-5-en-2,3-dicarboxylic acid anhydride (himic acid anhydride: NBDA), monoethyl maleate, monomethyl fumarate, monomethyl itaconate, monomethyl fumarate, dimethylaminoethyl methacrylate dimethylaminopropyl acrylamide, acrylamide, methacrylamide, maleic monoamide, maleic diamide, maleic N-monoethylamide, maleic N,N-diethylamide, maleic N-monobutylamide, maleic N,N-dibutylamide, fumaric monoamide, fumaric diamide, fumaric N-monoethylamide, fumaric N,N-diethylamide, fumaric N-monobutylamide, fumaric N,N-dibutylamide, maleimide, N-butyl maleimide, N-phenyl maleimide, sodium acrylate, sodium methacrylate, potassium acrylate, potassium methacrylate and the like.

Among them, maleic anhydride is most preferably used.

As the unsaturated aromatic monomer used in the modified polypropylene (E), styrene is most preferable. There can also be used o-methylstyrene, p-methylstyrene, m-methylstyrene, α-methylstyrene, vinyltoluene, divinylbenzene and mixtures thereof.

Although the modified polypropylene (E) can be produced in the absence of a free-radical initiator, it is usually preferably produced in the presence of a free-radical initiator. As the free-radical initiator, well-known ones can be used. The free-radical initiator includes, for example, azo compounds such as 2,2'-azobisisobutyronitrile, 2,2'-azobis[2,4,4]trimethylvaleronitrile, etc.; organic peroxides such as methyl ethyl ketone peroxide, cyclohexanone peroxide, 3,3,5-trimethylcyclohexanone peroxide, 2,2-bis(t-butylperoxy)butane, t-butyl hydroperoxide, cumene hydroperoxide, diisopropylbenzene hydroperoxide, 2,5-dimethylhexane-2,5-dihydroperoxide, di-t-butyl peroxide, 1,3-bis(t-butylperoxyisopropyl)benzene, 2,5-dimethyl-2,5-di(t-butylperoxy)hexane, 2,5-dimethyl-2,5-di(t-butylperoxy)hexyne-3, lauroyl peroxide, 3,3,5-trimethylhexanoyl peroxide, benzoyl peroxide, t-butyl peracetate, t-butylperoxyisobutyrate, t-butylperoxypivalate, t-butylperoxy-2-ethylhexanoate, t-butylperoxy-3,5,5-trimethylhexanoate, t-butylperoxylaurate, t-butylperoxybenzoate, di-t-butylperoxyisophthalate, 2,5-dimethyl-2,5-di(benzoylperoxy)hexane, t-butylperoxymaleic acid, t-butylperoxyisopropylcarbonate, polystyrene peroxide and the like.

In producing the modified polypropylene (E), the melt flow rate of a starting polypropylene (a crystalline propylene homopolymer, a crystalline propylene-ethylene/α-olefin block copolymer, a crystalline propylene-α-olefin random copolymer, or the like) is usually 0.05–60 g/10 min, preferably 0.1 to 40 g/10 min. The starting polypropylene is preferably chosen so as to adjust the melt flow rate of the resulting modified polypropylene (E) to 0.1–100 g/10 min, preferably 0.5–50 g/10 min. The number average molecular weight of the starting polypropylene is usually 7,000 to 800,000, preferably 10,000 to 700,000.

In producing the modified polypropylene (E) resin, the blending amounts of the individual constituents are as follows. The amount of the unsaturated carboxylic acid or derivative thereof is preferably 0.01 to 10 parts by weight, more preferably 0.1 to 5 parts by weight per 100 parts by weight of the polypropylene. The amount of the unsaturated aromatic monomer is preferably 0.01 to 10 parts by weight, more preferably 0.1 to 5 parts by weight per 100 parts by weight of the polypropylene. The amount of the free-radical initiator los preferably 0 to 5 parts by weight, more preferably 0.001 to 2 parts by weight per 100 parts by weight of the polypropylene. When the amount of the unsaturated carboxylic acid or derivative thereof is less than 0.01 part by weight, the product has no markedly improved quality in some cases. When it exceeds 10 parts by weight, the improvement hits the ceiling and no more remarkable effect is brought about. Moreover, the unsaturated carboxylic acid or derivative thereof remains unreacted in a larvae amount in the resulting polymer and as a results, offensive small, deterioration of physical properties, etc. occurs in some cases. When the amount of the unsaturated aromatic monomer is less than 0.01 part by weight, no marked improving effect is brought about in some cases. On the other hand, when it exceeds 10 parts by weight, the improving effect of said monomer hits the ceiling in some cases. When the amount of the free-radical initiator exceeds 5 parts by weight, its effect on the graft reaction of the unsaturated carboxylic acid or derivative thereof hits the ceiling in some cases, or the decomposition of the polypropylene becomes so serious that the fluidity (melt flow rate) changes greatly in some cases.

The polyester resin (F) used in the present invention is not critical so long as it is an essentially crystalline saturated polyester resin. For example, the polyester resin (F) is obtained from dicarboxylic acid components at least 40 mole % of which is terephthalic acid, and diol components. Specific examples of dicarboxylic acid components, other than terephthalic acid, are aliphatic dicarboxylic acids having 2 to 20 carbon atoms, such as adipic acid, sebacic acid, dodecanedicarboxylic acid and the like; aromatic dicarboxylic acids such as isophthalic acid, naphthalenedicarboxylic acid and the like; alicyclic dicarboxylic acids such as cyclohexanedicarboxylic acid and the like; and each or mixtures of those acids. The diol components includes each or mixtures of aliphatic and alicyclic glycols, such as ethylene glycol, 1,3-propanediol, 1,4-buanediol, 1,6-hexanediol, 1,10-decanediol, 1,4-cyclohexanediol and the like.

Among such saturated polyester resins, polybutylene terephthalate or polyethylene terephthalate permits more desirable exhibition of the effects of the present invention. The intrinsic viscosity of the saturated polyester resin is preferably in the range of 0.08–3.0 dl/g as measured at 25° C. using o-chlorophenol as a solvent.

The epoxy group containing copolymer (G) in the present invention is a copolymer obtained from an unsaturated epoxy compound and an ethylenic unsaturated compound.

Although the proportions of these compounds for the epoxy group containing copolymer (G) is not critical, the proportion of the unsaturated epoxy compound is usually 0.1 to 50% by weight, preferably 1 to 30% by weight.

As the unsaturated epoxy compound, any compound may be used so long as it has in the molecule an unsaturated group which permits copolymerization with the ethylenic unsaturated compound and an epoxy group.

The unsaturated epoxy compound includes, for example, unsaturated glycidyl esters and unsaturated glycidyl ethers which are represented by the following formulas (1) and (2), respectively.

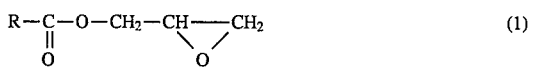

(1)

wherein R is a hydrocarbon group of 2–18 carbon atoms containing an ethylenic unsaturated bond.

(2)

wherein R is a hydrocarbon group of 2–18 carbon atoms containing an ethylenic unsaturated bond, and X is —CH$_2$—O — or a substituent represented by the following formula (3):

(3)

Specific examples of the unsaturated epoxy compound include glycidyl acrylate, glycidyl methacrylate, glycidyl itaconate, allyl glycidyl ether, 2-methyl allyl glycidyl ether, styrene p-glycidyl ether, etc.

The ethylenic unsaturated compound includes olefins, vinyl esters of saturated carboxylic acids of 2–6 carbon atoms, esters of saturated alcohols of 1–8 carbon atoms and acrylic acid, methacrylic acid, maleic acid or fumaric acid, vinyl halides, styrenes, nitriles, vinyl ethers, acrylamides, etc.

Specific examples of the ethylenic unsaturated compound include ethylene, propylene, butene-1, vinyl acetate, methyl acrylate, ethyl acrylate, methyl methacrylate, dimethyl maleate, diethyl fumarate, vinyl chloride, vinylidene chloride, styrene, acrylonitrile, isobutyl vinyl ether, acrylamide, etc. Among them, ethylene is particularly preferred.

For improving the impact resistance at low temperatures by lowering the glass transition temperature, it is preferable to use ethylene as second monomer and copolymerize a third commoner such as vinyl acetate and/or methyl acrylate.

The epoxy group containing copolymer can be produced by various methods. There can be employed either a random copolymerization method in which the unsaturated epoxy compound is introduced into the main chain of copolymer, or a graft copolymerization method in which the unsaturated epoxy compound is introduced as the side chain of copolymer. Specific examples of production process of the epoxy group containing copolymer include a process comprising copolymerizing the unsaturated epoxy compound with the ethylenic unsaturated compound in the presence of a radical-generating agent at 500 to 4,000 atmospheres and at 100° to 300° C. in the presence or absence of suitable solvent and chain transfer agent; a process comprising mixing a polypropylene with the unsaturated epoxy compound and a radical-generating agent, and subjecting the mixture to melt graft copolymerization in an extruder; and a process comprising copolymerizing the unsaturated epoxy compound with the ethylenic unsaturated compound in an inert medium such as water or organic solvent in the presence of a radical-generating agent.

The average particle size of the talc (H) used in the present invention is 4 μm or less, preferably 3 μm or less. When the average particle size exceeds 4 μm, the impact strength of the composition is greatly deteriorated and its appearance such as gloss is also deteriorated. Although untreated talc may be used, there can be used talc whose surface has been treated with any of generally known silane coupling agents, titanium coupling agents, long-chain aliphatic carboxylic acids, esters of long-chain aliphatic carboxylic acid, long-chain aliphatic carboxylic acid amides, salts of long-chain aliphatic carboxylic acids, and other surfactants in order to improve the adhesion at the boundary surface between talc and the polymers and the dispersibility of talc.

Here, the term "the average particle size of talc" means a particle size corresponding to 50% ($D_{50}$) which is determined through a cumulative distribution curve obtained by dissolving talc in a dispersion medium such as water or an alcohol, followed by measurement by means of a centrifugal sedimentation type particle size distribution measuring apparatus.

For using the thermoplastic resin composition of the present invention, for example, in a bumper, its physical properties can be evaluated as follows. The scratch resistance can be evaluated in terms of Rockwell hardness, and the dimensional stability in terms of coefficient of linear expansion by heat. The higher the Rockwell hardness, the higher the scratch resistance. The smaller the coefficient of linear expansion, the higher the dimensional stability.

As to the injection molding processability, both the molding cycle time and the surface quality should be evaluated by molding a full-sized and large-sized bumper. The fluidity can be evaluated in terms of melt flow rate. But, the plasticization time and the surface distortion cannot be evaluated using a simplified mold as a model, and should be evaluated by molding a large-sized bumper.

Specific examples of physical property values are as follows. As to the low-temperature impact strength, the Izod impact strength (notched) at −30° C. should be 5 kg·cm/cm or more, and the brittle temperature should be −30° C. or lower. The coefficient of linear expansion of molded product should be $7 \times 10^{-5}$ cm/cm·°C. or less in a practical temperature range of −30° C. to +80° C.

The thermoplastic resin composition of the present invention comprises a resin composition (D) comprising a crystalline polypropylene component (A), an ethylene-butene-1 copolymer rubber (B) and an ethylene-propylene copolymer rubber (C), a modified polypropylene (E), a saturated polyester resin (F), and epoxy group-containing copolymer (G) and optionally talc (H). Particularly when a flexible thermoplastic resin composition is produced, the talc (H) is not added.

When the proportion of the resin composition comprising the components (A), (B) and (C) is taken as 100% by weight, the proportion of the crystalline polypropylene component (A) is 50% by weight or more, that of the ethylene-butene-1 copolymer rubber (B) is 10 to 25% by weight, preferably 12 to 20% by weight, and that of the ethylene-propylene copolymer rubber (C) is 10 to 25% by weight, preferably 12 to 20% by weight. The proportion of the sum of the second segment (A') of the component (A) and the components (B) and (C) is 30 to 55% by weight, preferably 32 to 53% by weight, based on the weight of the composition (D). The proportion of the segment (A') is 10% by weight or more based on the total weight of the segment (A') and the components (B) and (C). The proportion of the component (B) is 40 to 60% by weight, preferably 45 to 55% by weight, based on the total weight of the components (B) and (C). The proportion of the sum of the components (B) and (C) is 30% by weight or more based on the weight of composition (D).

The modified polypropylene (E), the saturated polyester resin (F), the epoxy group-containing copolymer (G) and optionally the talc (H) are added in amounts of 0.1 to 5.0 parts by weight, 0.005 to 5 parts by weight, 0.1 to 5 parts by weight, and 1 to 22 parts by weight, per 100 parts by weight of the resin composition (D).

For reducing the molding cycle in injection molding and attaining a satisfactory surface quality therein, the melt flow rate (at 230° C. under a load of 2.16 kg using an orifice having a diameter of 2.095 mm and a length of 8.000 mm) of a resin composition containing components (A), (B), (C), (E), (F) and (G), and (H) if (H) is used, is preferably in the range of 15 to 25 g/10 min, preferably 17 to 23 g/10 min.

When the proportion of the crystalline polypropylene component (A) is less than 50% by weight when the proportion of the resin composition (D) comprising the components (A), (B) and (C) is taken as 100% by weight, the stiffness and the Rockwell hardness are low. The proportion of the ethylene-butene-1 copolymer rubber (B) is less than 10% by weight, the low-temperature impact strength is low. When it exceeds 25% by weight, the stiffness and the Rockwell hardness are low. The above applies also to the ethylene-propylene copolymer rubber (C) co-used.

The segment (A') improves the impact strength by improving the compatibility of the first segment of the component (A), with the component (B) or (C) to disperse these components uniformly. When the proportion of the sum of the segment (A') and the components (B) and (C) is less than 30% by weight based on the weight of composition (D), the low-temperature impact strength is low. When it exceeds 55% by weight, the stiffness and the Rockwell hardness are low. When the proportion of the segment (A') is less than 10% by weight based on the total weight of the segment (A') and the components (B) and (C), no desirable result can be obtained with respect to the low-temperature impact strength.

Both of the components (B) and (C) are used for improving the low-temperature impact strength. When the proportion of the component (B) is less than 40% by weight based on the total weight of the components (B) and (C), the Rockwell hardness is low. When it exceeds 60% by weight, the low-temperature impact strength is disadvantageously low.

In addition, the Rockwell hardness and the stiffness can be improved while maintaining the impact strength, by adding the modified polypropylene (E), the saturated polyester resin (F) and the epoxy group-containing copolymer (G), each in a small amount of less than 5 parts by weight per 100 parts by weight of the resin composition (D).

When the talc (H) is added, an amount of the talc of more than 22 parts by weight is not desirable because the low-temperature impact strength becomes too low though the stiffness is enhanced. When the proportion of the sum of the components (B) and (C) is less than 30% by weight, the coefficient of linear expansion is too large. Therefore, such a proportion is not desirable for practical purposes. When the melt flow rate of a mixture of the components (A), (B), (C), (E), (F) and (G) is less than 15 g/10 min, the fluidity is low, and surface distortion occurs, so that no desirable result can be obtained with respect to the surface quality. When the melt flow rate exceeds 25 g/10 min, the plasticization time is extended, resulting in a long molding cycle, and hence no desirable result can be obtained. Thus, the thermoplastic resin composition intended according to the present invention can be obtained only by specifying the structures of the components used, as described above, and limiting the proportions of the components to values in the specific ranges.

The composition of the present invention can be produced by means of a kneading machine such as a single-screw extruder, twin-screw extruder, Banbury mixer, heated roll or the like. The components may be mixed either at a same time or in several times. For the mixing in several times, there can be employed a method comprising kneading crystalline polypropylene with talc, and then adding ethylene-butene-1 copolymer rubber, ethylene-propylene copolymer rubber (these copolymer rubbers are hereinafter abbreviated as "rubbers") and the like; and a method comprising preparing a master batch previously by kneading talc with crystalline polypropylene to a high concentration, and then kneading the master batch while diluting the same with crystalline polypropylene, rubbers and the like. As other methods for the mixing in several times, there can be employed a method comprising kneading crystalline polypropylene with rubbers, followed by kneading therewith talc and the like; and a method comprising preparing a master batch previously by kneading rubbers with crystalline polypropylene to a high concentration, and adding crystalline polypropylene, talc and the like to the master batch, followed by kneading. As still other methods for the mixing in several times, there can be employed a method comprising kneading each of a combination of crystalline polypropylene and talc and a combination of crystalline polypropylene and rubbers previously, and combining the kneaded products finally, followed by kneading therewith the other components. For the kneading, a temperature of 160°–250° C. and a time of 1 to 20 minutes are necessary.

Besides the above basic components, additives such as antioxidants, ultraviolet absorbers, lubricants, pigments, antistatic agents, copper damage preventing agents, flame retardants, neutralizing agents, foaming agents, plasticizers, nucleating agents, foam-inhibitors, crosslinking agents, etc. may be incorporated into the composition in the above kneading machine.

Of these additives, the antioxidants and the ultraviolet absorbers are preferably incorporated for improving the weather resistance, heat resistance and oxidation resistance in the open. The antioxidants include 2,6-di-t-butylphenol, 2,3-di-t-butyl-4-ethylphenol, 2,6-di-t-butyl-α-dimethylamino-p-cresol, 6-(4-hydroxy-3,5-di-t-butylanilino)-2,4-bisoctyl-thio-1,3,5-triazine, 2,6-di-t-butyl-4-methylphenol, tris(2-methyl-4-hydroxy-5-t-butylphenyl)butane, tetrakis-[methylene-3-(3',5'-di-t-butyl-4'-hydroxyphenyl)propionate]methane, dilauryl thiodipropionate, etc. The ultraviolet absorbers include 2-hydroxy-4-n-octoxybenzophenone, 2-hydroxy-4-octadecyloxybenzophenone, 4-dodecyloxy-2-hydroxybenzophenone, 2-(2'-hydroxy-3'-t-butyl-5'-methylphenyl)-5-chlorobenzotriazole, 2-(2'-hydroxy-3',5'-di-t-butyl-phenyl)- 5-chlorobenzotriazole, bis(2,6-dimethyl-4-piperidyl) sebacate, etc.

The thermoplastic resin composition of the present invention is excellent in stiffness, Rockwell hardness and low-temperature impact strength. Molded products can be obtained from said composition by various molding methods such as extrusion molding, blow molding, press molding, injection molding, etc. Of these methods, injection molding is the most preferable for further reducing the coefficient of linear expansion of a molded product of the composition. Said composition is markedly characterized also with respect to its injection molding processability, for example, in that its molding cycle time is short and that its surface quality is excellent. Furthermore, the molded product obtained by injection molding has an excellent surface quality and a small coefficient of linear expansion. Therefore, said composition can be advantageously used as a material for bumpers for automobile, in particular, large-sized bumpers which are severely required to have excellent surface quality and dimensional stability.

The following examples serve to give specific illustration of the practice of the present invention but they are not intended in any way to limit the scope of the present invention.

Methods for measuring the physical properties in the examples are described below.

(1) Melt flow rate

Measured according to the method prescribed in JIS K6758. The measuring temperature was 230° C. and the measurement was carried out under a load of 2.16 kg using an orifice having an inside diameter of 2.095 mm, an outside diameter of 9.50 mm and a length of 8.000 mm unless otherwise specified.

(2) Tensile test

Carried out according to the method prescribed in ASTM D638. A test piece obtained by injection molding was used. The thickness of the test piece was 3.2 mm, and the tensile elongation was evaluated. The measuring temperature was 23° C. unless otherwise specified.

(3) Flexural test

Carried out according to the method prescribed in JIS K7203. A test piece obtained by injection molding was used. The thickness of the test piece was 6.4 mm, and the flexural modulus and the flexural strength were evaluated under conditions of a span length of 100 mm and a loading rate of 2.0 mm/min. The measuring temperature was 23° C. unless otherwise specified.

(4) Izod impact strength

Measured according to the method prescribed in JIS K7110. A test piece obtained by injection molding was used. The thickness of the test piece was 6.4 mm and the notched impact strength after notching conducted after the molding was evaluated. The measuring temperature was 23° C. unless otherwise specified. When the measurement was carried out at a temperature other than 23° C., the sample was subjected to the measurement after having been conditioned in a constant temperature bath at a predetermined temperature for 2 hours.

(5) Brittle temperature

Measured according to the method prescribed in JIS K6758. Predetermined 6.3×38×2 (mm) test pieces were punched out of a 25×150×2 (mm) flat plate obtained by injection molding, and evaluated by the prescribed method.

(6) Rockwell hardness

Measured according to the method prescribed in JIS K7207. Test pieces of 3.0 mm in thickness obtained by injection molding were used. Two of the test pieces were placed one upon another and the resulting assembly was used. As a steel ball, R was used. The evaluation value is expressed on R scale.

(7) Thermal deformation temperature

Measured according to the method prescribed in JIS K7207. Measured at a fiber stress of 4.6 kg/cm$^2$.

(8) Mooney viscosity

Measured according to the method prescribed in JIS K6300. The measuring temperature was 100° C.

(9) Ethylene content, propylene content, and butene-1 content

By the use of a calibration curve, the ethylene content or the propylene content was determined from the absorbances of characteristic absorptions due to methyl (—$CH_3$) and methylene (—$CH_2$—) which appeared in an infrared spectrum measured by using a pressed sheet previously prepared, and the butene content was determined from the absorbance of characteristic absorption due to ethyl which appeared in the infrared spectrum.

(10) Intrinsic viscosity

The reduced viscosity was measured at three concentrations of 0.1, 0.2 and 0.5 g/dl by means of an Ubbelohde viscometer. The intrinsic viscosity was determined by the calculation method described in "Kobunsi Yoeki (Polymer Solutions), Kobunshi Jikkengaku (Polymer Experiments) 11" KYORITSU-SHUPPAN Ltd., p. 491 (1982), namely, the extrapolation method which comprises plotting reduced viscosity against concentration and extrapolating concentration to zero.

For the crystalline polypropylene, the intrinsic viscosity was measured at a temperature of 135° C. using tetralin as a solvent. For the ethylene-butene-1 copolymer rubber and the ethylene-propylene copolymer rubber, the intrinsic viscosity was determined at a temperature of 70° C. using xylene as a solvent.

(11) Molecular weight distribution

Measured by a gel permeation chromatography (GPC) under the following conditions.

① Crystalline polypropylene
GPC: type 150C. mfd. by Waters.
Column: Shodex 80 MA mfd. by Showa Denko K.K., (two columns)
Amount of sample: 300 μl (polymer concentration 0.2 wt %)
Flow rate: 1 ml/min.
Temperature: 135° C.
Solvent: o-dichlorobenzene.

A calibration curve of volume eluted vs. molecular weight was obtained using standard polystyrene mfd. by TOHSOH CORP. Using the standard curve, the weight average molecular weight and number average molecular weight of a sample in terms of polystyrene were determined. The Q value (weight average molecular weight/number average molecular weight) was determined as a measure of the molecular weight distribution.

② Ethylene-butene-1 copolymer rubber and ethylene-propylene copolymer rubber
GPC: type 150C, mfd. by Waters.
Column: Shodex 80 MA mfd. by Showa Denko K.K., (one column)
Amount of sample: 300 μl (polymer concentration 0.2 wt %)
Flow rate: 1 ml/min.
Temperature: 145° C.
Solvent: o-dichlorobenzene.

A calibration curve of volume eluted vs. molecular weight was obtained using standard polystyrene mfd. by TOHSOH CORP. Using the standard curve, the weight average molecular weight and number average molecular weight of a sample in terms of polystyrene were determined. The Q value (weight average molecular weight/number average molecular weight) was determined as a measure of the molecular weight distribution.

(12) Average particle size of talc ($D_{50}$)

A centrifugal sedimentation type particle distribution measuring apparatus Model SA-CP2-20 mfd. by Shimadzu Corp. was used. Talc was suspended in water and a small amount of sodium hexametaphosphate was added to obtain a uniform suspension. The suspension was placed in a cell to adjust the liquid level to 3 cm, and a particle size distribution curve was measured at a revolution rate of 500 rpm. A cumulative distribution curve was obtained and the average particle size corresponding to 50% weight ($D_{50}$) was determined.

(13) Evaluation of injection molding processability

A composition was dried in a hot-air dryer at 120° C. for 2 hours and injection-molded into the bumper for automobile shown in FIG. 1, under the following molding conditions and evaluated:

The dimensions and weight of the bumper obtained by the injection molding are as follows:

| Dimensions of the bumper: | |
|---|---|
| 1) Perimeter | 2,930 mm |
| 2) Width | $l_1$:510 nm, $l_2$:370 mm |
| 3) Thickness | 4 mm |
| 4) Gate width | 600 mm |
| Weight of the bumper | 4,900 to 5,000 g |

The molding was carried out with a UBEMAX-UV 4000-8301 type injection molding machine mfd. by Ube Industries, Ltd. at a cylinder preset temperature of 200° C. and a mold preset temperature of 30° C. by using the following standard cycle: die descent-[injection-screw advance]-[holding-cooling, plasticization (metering)]-die ascent-[extrusion-withdrawal]. The sum of times required for these operations is referred to as "molding cycle time". The operations in each bracket proceed in part at the same time.

FIG. 1 shows phenomena undesirable for the surface quality of the bumper. The undesirable phenomena include the following: 2—regular and linear depressions and protuberances formed in the direction of flow near the gate, 3—gate distortion, 4—end distortion, 5—flow marks. The gate distortion and the end distortion are undulations formed near the gate and the end, respectively. The two distortions are referred to generically as "surface distortion". The flow marks are regular and zonal depressions and protuberances formed at the end in a direction perpendicular to the direction of flow. All of these phenomena are undesirable phenomena of the surface which are caused as follows: distortion of the order of micron is caused on the surface of the bumper, i.e., the molded product, because the surface of the mold is not faithfully transcripted.

For preventing the surface distortion among the undesirable phenomena of the surface, there is mainly employed a method of extending the holding time and the cooling time. Basically, the plasticization time should be shorter than the cooling time. Even when the cooling time is reduced, the molding cycle time is not consequently reduced unless the plasticization time is longer than the cooling time.

Therefore, the molding cycle time is evaluated in terms of the following items:

1) Holding time for preventing the surface distortion.
2) Cooling time for preventing the surface distortion.
3) Plasticization time.

On the other hand, the surface quality is evaluated in terms of the following items:

1) Surface distortion.
2) Flow marks.
3) Regular and linear depressions and protuberances formed in the direction of flow near the gate.

(14) Pendulum test

Measured according to the method prescribed in FMVSS 581. A bumper obtained by the above injection molding was subjected to the impact test. The measuring temperature was −30° C. and the effective impact mass 1,000 kg.

(15) Initial degree of adhesion of coating layer

The surface of a test piece cut out of a bumper obtained by the above injection molding was washed with vaporized 1,1,1-trichloroethane (74° C.) for 30 seconds, dried at ordinary temperature, coated with RB 291H mfd. by Nippon Bee Chemical Co. as a primer, followed by baking in an oven at 100° C. for 20 minutes. Subsequently, a urethane coating (Flexthane #101, mfd. by Nippon Bee Chemical Co.) was spray-coated on the test piece, followed by baking finish in an oven at 120° C. for 40 minutes. The coating film of the coated test piece was cut with a razor into 100 even squares (10×10) of 2 mm square. On the coating film, a pressure sensitive adhesive tape of 24 mm width (Cellotape® mfd. by Nichiban Co., Ltd.) was pressed with a finger. Thereafter, the tape was peeled off at a breath with pinching the edge of the tape. The percentage of retention was determined by counting the remaining squares.

(16) Dimensional stability

The bumper obtained by the above injection molding was annealed at 120° C. for 1 hour, attached to the body of an automobile, and subjected to a heat cycle test under the conditions described below. The degree of dislocation of the bumper on the body at 80° C. and 130° C. in the heat cycle test was visually evaluated. In the heat cycle test, the bumper was maintained at 80° C. for 7.5 hours, at 23° C. for 0.5 hours, and then at −30° C. for 7.5 hours. This cycle was repeated 4 times.

Test pieces for evaluating the physical properties in the above tests (2), (3), (4), (6) and (7) were prepared under the following injection molding conditions unless otherwise specified. A composition was dried in a hot-air dryer at 120° C. for 2 hours and then injection-molded with a IS150E-V type injection molding machine mfd. by Toshiba Machine Co., Ltd. at a molding temperature of 200° C. and a mold-cooling temperature of 50° C. for 15 seconds for injection and 30 seconds for cooling.

Test pieces for evaluating the physical property in the above test (5) were prepared under the following injection molding conditions unless otherwise specified. A composition was dried in a hot-air dryer at 120° C. for 2 hours and then injection-molded with a FS 75 (N) type injection molding machine mfd. by Nissei Jushi Kogyo at a molding temperature of 200° C. and a mold-cooling temperature of 50° C. for 15 seconds for injection and 30 seconds for cooling.

The compositions described below were produced under the following conditions unless otherwise specified. Predetermined amounts of components were weighed individually, uniformly premixed in Henschel mixer, and then kneaded in a twin screw continuous kneading machine (Model TEX 44 SS 30BW-2V, mfd. by JAPAN STEEL WORKS LTD.) with suction through a vent at an extrusion rate of 30 kg/hour, a resin temperature of 180° C. and a screw revolution rate of 350 revolutions/min. The screws were composed of two sets of a triple-thread rotor and a triple thread kneading disc which sets were placed in two kneading zones, e.g., a zone next to the first feed opening and a zone next to the second feed opening, respectively.

In the following examples and comparative examples, starting materials obtained by the processes described in Referential Examples 1 to 4 were used.

Referential Example 1

Production of crystalline polypropylenes (A)

PP-1; the crystalline polypropylene described below was produced by the slurry polymerization process disclosed in JP-A-60-228504:

A crystalline propylene-ethylene block copolymer having the following properties:

| | |
|---|---|
| Melt flow rate (hereinafter abbreviated as MFR): | 60 g/10 min, |
| Intrinsic viscosity in tetralin at 135° C. (hereinafter abbreviated as $[\eta]_T$): | 1.4 dl/g, |
| Content of polypropylene homopolymer portion, the first segment produced in the first polymerization step (hereinafter abbreviated as the P portion): | 88% by weight, |
| Content of ethylene-propylene random copolymer portion, the second segment produced in the second polymerization step (hereinafter abbreviated as the EP portion) (hereinafter abbreviated as EP content): | 12% by weight, |
| Q value of molecular weight distribution of the P portion: | 7 |
| Intrinsic viscosity of the P portion in tetralin at 135OC (hereinafter abbreviated as $[\eta]_P$) | 0.9 dl/g, |
| 20° C. Cold xylene soluble of the P portion (hereinafter abbreviated as CXS): | 2.4% by weight, |
| Boiling heptane soluble of the P portion (hereinafter abbreviated as BHS): | 6.5% by weight, |
| Isotactic pented of the boiling heptane insoluble of the P portion (hereinafter abbreviated as IPF): | 0.972, |
| Calculated viscosity parameter of the EP Portion (hereinafter abbreviated as $[\eta]_{EP}$: | 5.2 dl/g, and |
| Weight ratio of ethylene-propylene in the EP portion (hereinafter abbreviated as $(C'_2)_{EP}$: | 32/68. |

PP-2; the crystalline polypropylene described below was produced by the slurry polymerization process disclosed in JP-A-1-319508.

A crystalline propylene-ethylene block copolymer having the following properties: MFR 58 g/10 min, $[\eta]_T$ 1.4 dl/g, EP content 12% by weight, Q value of the P portion 4, $[\eta]_P$ 0.9, CXS 0.9% by weight, BHS 3.6% by weight, IPF 0.972, $[\eta]_{EP}$ 5.2, and $(C'_2)_{EP}$ 32% by weight.

Crystalline propylene-ethylene block copolymers PP-3 to PP-10 having the molecular structures shown in Table 1 were produced by the same production process as that of PP-2.

Table 1 summarizes the constitutions of PP-1 to PP-10.

Referential Example 2

Production of ethylene-butene-1 copolymer rubbers (B)

Ethylene-butene-1 copolymer rubbers were produced by a homogeneous solution method according to the process disclosed in JP-B-44-9390.

EBR-1; an ethylene-butene-1 copolymer rubber having a butene-1 content of 25% by weight, an intrinsic viscosity in xylene at 70° C. of 1.0 dl/g, a Mooney viscosity at 100° C. $ML_{1+4}$ 100 of 3, and Q value of molecular weight distribution of 2.0.

Four ethylene-butene-1 copolymer rubbers EBR-2 to EBR-5 having different molecular structures were produced by the same method as above. Table 2 summarizes the contents of the five ethylene-butene-1 copolymer rubbers including EBR-1.

Referential Example 3

Production of ethylene-propylene copolymer rubbers (C)

Polymerization was carried out by the same method as in Referential Example 2.

EPR-1; an ethylene-propylene copolymer rubber having a propylene content of 27% by weight, an intrinsic viscosity in xylene at 70° C. of 1.5 dl/g and a Mooney viscosity at 100° C. $ML_{1+4}$ 100 of 23.

Four ethylene-propylene copolymer rubbers EPR-2 to EPR-5 having different molecular structures were produced by the same method as above. Table 3 summarizes the constitutions of the five ethylene-propylene copolymer rubbers including EPR-1.

Referential Example 4

Production of a modified polypropylene (E)

A modified polypropylene (E) was produced in the following manner. A starting propylene homopolymer having a melt flow rate of 1.3 g/10 min, an intrinsic viscosity in tetralin at 135° C. of 2.45 dl/g, a 20° C. cold xylene soluble of 2.9% by weight, a boiling heptane soluble of 6.7% by weight, and an isotactic pentad of boiling heptane insoluble of 0.955 was modified as follows which had been produced by slurry polymerization by the process disclosed in JP-A-60-28405.

With 100 parts by weight of the starting propylene homopolymer were uniformly mixed in a Henschel mixer 1.0 part by weight of maleic anhydride, 0.5 part by weight of styrene, 0.6 part by weight of the propylene homopolymer containing as free-radical initiator 8% by weight of 1,3-bis(t-butylperoxyisopropyl)benzene (Sanperox®-TY1.3, mfd. by Sanken Kako Co., Ltd.) supported thereon, and 0.1 part by weight of Irganox® 1010 (mfd. by Ciba-Geigy Ltd.) as stabilizer. The resulting mixture was melt-kneaded by means of a TEX 44 SS-30BW-2V type twin screw extruder mfd. by JAPAN STEEL WORKS. LTD., at a temperature of 220° C. for an average residence time of 1.5 minutes to obtain a (maleic andride-styrene)-modified polypropylene (E) having an amount of maleic anhydride added of 0.15% by weight, an amount of styrene added of 0.07% by weight and a melt flow rate of 21 g/10 min. Said modified polypropylene (E) is hereinafter abbreviated as MS-PP-1.

Referential Example 5

Production of an epoxy group-containing copolymer (G)

An epoxy group containing copolymer (G) was produced in the following manner. A terpolymer of ethylene, vinyl acetate and glycidyl methacrylate in the ratio of 85:5:10 by weight having a melt flow rate of 7 g/10 min. (190° C., load 2.16 kg) was produced by high-pressure radical polymerization according to the process disclosed in JP-A-47-23490 and JP-A-48-11888. This epoxy group containing copolymer is hereinafter abbreviated as E-VA-GMA-1.

Referential Example 6

Talc (H)

Rough talc was mechanically ground and then classified by dry process to obtain talc having the following average particle size:

Talc-1; $D_{50}$=2.1 μm.

Examples 1 to 3 and Comparative Examples 1 to 7

Three was prepared a blend consisting of 19% by weight of EBR-2 as ethylene-butene-1 copolymer rubber (B), 19% by weight of EPR-2 as ethylene-propylene copolymer rubber (C) and 62% by weight of each of the various crystalline propylene-ethylene block copolymers PP-1 to PP-10 shown in Table 1, as crystalline polypropylene (A). With 100 parts by weight of said blend were blended 1 part by weight of MS-PP-1 as modified polypropylene (E), 2 parts by weight of polybutylene terephthalate (Toughpet PBT® N1000, mfd. by Mitsubishi Rayon Co., Ltd.) as saturated polyester resin (F) and 1 part by weight of E-VA-GMA-1 as epoxy group-containing copolymer (G). The resulting blend was kneaded under predetermined conditions. Each of the compositions thus obtained was injection-molded into test pieces under the predetermined conditions. Table 4 shows the results of evaluation of physical properties. The injection molding processability of the compositions was evaluated by the predetermined method. Table 5 shows the result of this evaluation.

Comparative Example 8

The same procedure as in Example 2 was repeated except for omitting the modified polypropylene (E), the saturated polyester resin (F) and the epoxy group-containing copolymer (G).

Table 4 shows the results of evaluation of physical properties.

Example 4 and Comparative Examples 9 to 11

Compositions were prepared in the same manner as in Example 2, except that as ethylene-butene-1 copolymer rubber (B), each of the ethylene-butene-1 copolymer rubbers EBR-1 and EBR-3 to EBR-5 having different structures which are shown in Table 2 was used in place of EBR-2. Test pieces were produced under the predetermined conditions and evaluated. Table 6 shows the results of evaluating physical properties.

Example 5 and Comparative Examples 12 to 14

Compositions were prepared in the same manner as in Example 2, except that as ethylene-propylene copolymer rubber (C), each of the ethylene-propylene copolymer rubbers EPR-1 and EPR-3 to EPR-5 having different structures which are shown in Table 2 was used in place of EPR-2. Test pieces were produced under the predetermined conditions and evaluated. Table 7 shows the results of evaluating physical properties.

Example 6

There was prepared a blend consisting of 66% by weight of PP-2 as crystalline polypropylene (A), 17% by weight of EBR-2 as ethylene-butene-1 copolymer rubber (B) and 17% by weight of EPR-2 as ethylene-propylene copolymer rubber (C). With 100 parts by weight of said blend were blended 1 part by weight of MS-PP-1 as modified polypropylene (E), 0.5 part by weight of a polybutylene terephthalate (Toughpet PBT® N1000, mfd. by Mitsubishi Rayon Co., Ltd.) as saturated polyester resin (F), 1 part by weight of E-VA-GMA-1 as epoxy group-containing copolymer (G) and 11 parts by weight of talc. The resulting blend was kneaded under predetermined conditions. Test pieces were produced from each of the thus obtained compositions under the predetermined conditions and evaluated. Table 8 shows the results of evaluation of physical properties.

Example 7

A composition was prepared in the same manner as in Example 6, except that the amount of talc was changed to 20 parts by weight. Test pieces were produced under the predetermined conditions and evaluated.

Table 8 shows the results of evaluating physical properties.

Comparative Example 15

A composition was prepared in the same manner as in Example 6, except that the amount of talc was changed to 25 parts by weight. Test pieces were produced under the predetermined conditions and evaluated.

Table 8 shows the results of evaluating physical properties.

Examples 8 to 9 and Comparative Examples 16 to 17

A bumper for automobile was injection-molded out of each of the compositions obtained in Examples 1 and 6 and Comparative Examples 1 and 15, under the predetermined conditions. The bumpers thus obtained were subjected to the pendulum test. Their initial degree of adhesion of coating layer, dimensional stability and scratch resistance were also evaluated. The scratch resistance was evaluated by investigating the degree of damage to the molded product by handling during coating operations visually and qualitatively. Table 9 shows the results of evaluating these properties.

The thermoplastic resin composition of the present invention is markedly advantageous in not only being excellent in low-temperature impact strength, stiffness, injection molding processability and dimensional stability indispensable for large-sized injection-molded products, but also being good in scratch resistance which is often a problem in handling of a molded product.

The novel thermoplastic resin composition provided by the present invention can easily be processed into a molded product, a film, a sheet or the like by a conventional processing method, for example, injection molding, extrusion molding, press molding or the like. Of these methods, injection molding is the most preferable molding method because it imparts a good dimensional stability to said thermoplastic resin composition. Injection molding can be advantageously employed for producing a large-sized bumper having a high stiffness which has come to be severely required to have a high precision of attachment to the body of an automobile and a high dimensional stability, and optionally exhibits high low-temperature impact strength, stiffness and Rockwell hardness and a small coefficient of linear expansion, which composition gives an injection-molded article suitably used for a bumper for automobile.

TABLE 1

Crystalline Polypropylene

| | Molecular structure | | | | | | | | | |
|---|---|---|---|---|---|---|---|---|---|---|
| | Whole polymer | | | | P portion | | | | EP portion | |
| No. | MFR g/10 min | $[\eta]_T$ dl/g | EP content wt % | Q value — | $[\eta]_P$ dl/g | CXS wt % | BHS wt % | IPF — | $[\eta]_{EP}$ dl/g | $(C'_2)_{EP}$ wt % |
| PP-1 | 60 | 1.4 | 12 | 7 | 0.9 | 2.4 | 6.5 | 0.972 | 5.2 | 32 |
| PP-2 | 58 | 1.4 | 12 | 4 | 0.9 | 0.9 | 3.6 | 0.972 | 5.2 | 32 |
| PP-3 | 30 | 1.5 | 12 | 4 | 1.0 | 0.8 | 3.3 | 0.972 | 5.2 | 32 |
| PP-4 | 80 | 1.3 | 12 | 4 | 0.8 | 0.9 | 3.6 | 0.972 | 5.2 | 32 |
| PP-5 | 90 | 1.2 | 12 | 4 | 0.9 | 0.9 | 3.6 | 0.972 | 3.0 | 32 |
| PP-6 | 65 | 1.3 | 12 | 4 | 0.9 | 0.9 | 3.6 | 0.972 | 4.0 | 32 |
| PP-7 | 58 | 1.4 | 12 | 4 | 0.9 | 0.9 | 3.6 | 0.972 | 5.2 | 20 |
| PP-8 | 58 | 1.4 | 12 | 4 | 0.9 | 0.9 | 3.6 | 0.972 | 5.2 | 63 |
| PP-9 | 58 | 1.4 | 12 | 4 | 0.9 | 0.3 | 2.5 | 0.985 | 5.2 | 32 |
| PP-10 | 58 | 1.4 | 12 | 4 | 0.9 | 1.3 | 6.2 | 0.950 | 5.2 | 32 |

TABLE 2

Ethylene-Butene-1 Copolymer Rubber

| | Molecular structure | | | |
|---|---|---|---|---|
| No. | Butene-1 content wt % | Intrinsic[*1] viscosity dl/g | Mooney[*2] viscosity | Q value[*3] |
| EBR-1 | 18 | 1.0 | 3 | 2.0 |
| EBR-2 | 18 | 1.4 | 14 | 2.1 |
| EBR-3 | 18 | 1.7 | 30 | 2.2 |
| EBR-4 | 18 | 2.2 | 96 | 2.2 |
| EBR-5 | 10 | 1.7 | 30 | 2.2 |

[*1]intrinsic viscosity in xylene at 70° C.
[*2]Mooney viscosity at 100° C., $ML_{1+4}$ 100.
[*3]Q value = weight average molecular weight/number average molecular weight.

TABLE 3

Ethylene-Propylene Copolymer Rubber

| | Molecular structure | | | |
|---|---|---|---|---|
| No. | Propylene content wt % | Intrinsic[*1] viscosity dl/g | Mooney[*2] viscosity | Q value[*3] |
| EPR-1 | 27 | 1.5 | 23 | 2.0 |
| EPR-2 | 27 | 1.9 | 50 | 2.1 |
| EPR-3 | 27 | 2.0 | 68 | 2.1 |
| EPR-4 | 27 | 2.3 | 105 | 2.4 |
| EPR-5 | 17 | 2.1 | 88 | 2.3 |

[*1]Intrinsic viscosity in xylene at 70° C.
[*2]Mooney viscosity at 100° C., $ML_{1+4}$ 100.
[*3]Q value = weight average molecular weight/number average molecular weight.

TABLE 4

Physical Properties of Compositions

| | | Physical properties | | | | | |
|---|---|---|---|---|---|---|---|
| No. of experiment | Component (A) | Melt flow rate (g/10 min) | Tensile elongation % | Modulus in flexure kg/cm² | Izod impact strength −30° C. kg · cm/cm | Brittle temp. °C. | Rockwell hardness |
| Comparative Example 1 | PP-1 | 21 | 300 | 6200 | 9.2 | −44 | 36 |
| Example 1 | PP-2 | 21 | >500 | 6100 | 9.3 | <−50 | 41 |
| Comparative Example 2 | PP-3 | 13 | >500 | 6200 | 9.2 | <−50 | 36 |
| Comparative Example 3 | PP-4 | 24 | 300 | 6300 | 9.1 | −42 | 42 |
| Comparative Example 4 | PP-5 | 25 | >500 | 6100 | 9.3 | <−50 | 39 |
| Comparative Example 5 | PP-6 | 22 | >500 | 6100 | 9.3 | <−50 | 40 |
| Comparative Example 6 | PP-7 | 21 | >500 | 6200 | 8.6 | −45 | 41 |
| Comparative | PP-8 | 21 | 300 | 6100 | 4.9 | −42 | 43 |

TABLE 4-continued

Physical Properties of Compositions

| No. of experiment | Component (A) | Melt flow rate (g/10 min) | Tensile elongation % | Modulus in flexure kg/cm² | Izod impact strength −30° C. kg · cm/cm | Brittle temp. °C. | Rockwell hardness |
|---|---|---|---|---|---|---|---|
| Example 7 | | | | | | | |
| Example 2 | PP-9 | 21 | >500 | 6000 | 10.5 | <−50 | 43 |
| Example 3 | PP-10 | 21 | >500 | 6300 | 8.7 | <−50 | 42 |
| Comparative Example 8 | PP-9 | 20 | >500 | 5900 | 9.8 | <−50 | 40 |

TABLE 5

Evaluation of Injection molding Processability

| No. of experiment | Crystalline polypropylene | Molding cycle*¹ | | | Surface distortion | Flow marks | Surface quality*² regular and linear depression and protuberances |
|---|---|---|---|---|---|---|---|
| | | Holding time sec. | Cooling time sec. | Plasticization time sec. | | | |
| Comparative Example 1 | PP-1 | 12 | 35 | 31 | o | Δ | o |
| Example 1 | PP-2 | 12 | 35 | 26 | o | o | o |
| Comparative Example 2 | PP-3 | 20 | 45 | 26 | Δ | x | o |
| Comparative Example 3 | PP-4 | 12 | 35 | 31 | o | o | o |
| Comparative Example 4 | PP-5 | 12 | 35 | 31 | o | Δ | o |
| Comparative Example 5 | PP-6 | 12 | 35 | 31 | o | Δ | o |
| Comparative Example 6 | PP-7 | 12 | 35 | 31 | o | o | o |
| Comparative Example 7 | PP-8 | 12 | 35 | 31 | o | o | x |
| Example 2 | PP-9 | 12 | 35 | 26 | o | o | x |
| Example 3 | PP-10 | 12 | 35 | 26 | o | o | o |

*¹Holding time and cooling times are times required for preventing surface distortion. The shorter, the better.
*²Rating of surface quality; o: satisfactory, Δ: acceptable, x: not acceptable.

TABLE 6

Physical Properties of Compositions

| No. of experiment | Component (B) | Melt flow rate (g/10 min) | Tensile elongation % | Modulus in flexure kg/cm² | Izod impact strength −30° C. kg · cm/cm | Brittle temp. °C. | Rockwell hardness |
|---|---|---|---|---|---|---|---|
| Comparative Example 9 | EBR-1 | 23 | >500 | 6000 | 9.7 | −44 | 36 |
| Example 4 | EBR-3 | 20 | >500 | 6200 | 9.2 | <−50 | 41 |
| Comparative Example 10 | EBR-4 | 12 | >500 | 6200 | 6.4 | −40 | 43 |
| Comparative Example 11 | EBR-5 | 17 | >500 | 6300 | 6.1 | −41 | 46 |

TABLE 7

Physical Properties of Compositions

| No. of experiment | Component (C) | Melt flow rate (g/10 min) | Tensile elongation % | Modulus in flexure kg/cm$^2$ | Izod impact strength −30° C. kg · cm/cm | Brittle temp. °C. | Rockwell hardness |
| --- | --- | --- | --- | --- | --- | --- | --- |
| Comparative Example 12 | EPR-1 | 24 | >500 | 6000 | 6.9 | −44 | 36 |
| Example 5 | EPR-3 | 20 | >500 | 6300 | 9.1 | <−50 | 41 |
| Comparative Example 13 | EPR-4 | 14 | >500 | 6300 | 6.5 | −40 | 43 |
| Comparative Example 14 | EPR-5 | 16 | >500 | 6300 | 6.3 | −41 | 45 |

TABLE 8

Blending Proportions and Physical Properties of Compositions

| No. of experiment | Component (A) <PP-2> | Component (B) <EBR-2> | Component (C) <EPR-2> | Component (E) <MS-PP-1> | Component (F) | Component (G) <E-VA-GMA-1> | Component (H) <talc-1> |
| --- | --- | --- | --- | --- | --- | --- | --- |
| Example 6 | 66 | 17 | 17 | 1 | 0.5 | 1 | 11 |
| Example 7 | 66 | 17 | 17 | 1 | 0.5 | 1 | 20 |
| Comparative Example 15 | 66 | 17 | 17 | 1 | 0.5 | 1 | 25 |

| No. of experiment | Melt flow rate (g/10 min) | Modulus in flexure kg/cm$^2$ | Izod impact strength −30° C. kg · cm/cm | Brittle temp. °C. | Rockwell hardness |
| --- | --- | --- | --- | --- | --- |
| Example 6 | 19 | 14500 | 5.3 | −33 | 54 |
| Example 7 | 17 | 17600 | 5.1 | −32 | 53 |
| Comparative Example 15 | 14 | 18000 | 4.1 | −25 | 56 |

TABLE 9

Evaluation of Bumpers

| No. of experiment | No. of experiment on production of composition used | Pendulum test | Initial degree of adhesion of coating layer | Dimensional stability | Scratch resistance |
| --- | --- | --- | --- | --- | --- |
| Example 8 | Example 1 | o | o | o | o |
| Example 9 | Example 6 | o | o | o | o |
| Comparative Example 16 | Example 1 | x | o | o | o |
| Comparative Example 17 | Comparative Example 15 | x | o | o | o |

Note:
*[1] o Satisfactory, x Not acceptable

What is claimed is:

1. A thermoplastic resin composition consisting essentially of:

100 parts by weight of a resin composition (D) comprising:

not less than 50% by weight of a crystalline polypropylene component (A), 10 to 25% by weight of an ethylene-butene-1-copolymer rubber (B), and 10 to 25% by weight of an ethylene-propylene copolymer rubber (C);

0.1 to 5.0 parts by weight of a modified polypropylene (E);
0.005 to 5 parts by weight of a saturated polyester resin (F); and
0.1 to 5.0 parts by weight of an epoxy group-containing copolymer (G), said crystalline polypropylene component (A) being selected from the group consisting of:
(i) the product of a polymerization of propylene in the first step and a random copolymerization of propylene and ethylene in the second step, each of which have been polymerized in the presence of a Ziegler-Natta catalyst by sequentially passing propylene monomer, and then propylene/ethylene monomers over the catalyst consisting of:
30 to 90% by weight of propylene homopolymer portions as the first segment which have a molecular weight distribution of 5 or less as determined by gel permeation chromatography and an intrinsic viscosity of 0.85 to 0.95 dl/g as determined at 135° C. using tetralin as a solvent, and 10 to 70% by weight of propylene-ethylene random copolymer portions as the second segment (A') which have a calculated viscosity parameter $[\eta]_{EP}$ of 4.5 to 5.5 dl/g as defined below, $$[\eta]_{EP}=[\eta]_T/X-(1/X-1)[\eta]_P$$

wherein
$[\eta]_P$: the intrinsic viscosity (dl/g) of the crystalline propylene homopolymer portion as determined at 135° C. using tetralin as a solvent
$[\eta]_T$: the intrinsic viscosity (dl/g) of the whole block copolymer as determined at 135° C. using tetralin as a solvent $$X=1-(\Delta Hf)_T/(\Delta Hf)_P$$

wherein
$(\Delta Hf)_T$: the quantity of fusion (cal/g) of the whole block copolymer,
$(\Delta Hf)_P$: the quantity of fusion (cal/g) of the crystalline propylene homopolymer portion,
and a weight ratio of the propylene units to the ethylene units of 75:25 to 60:40, and
(ii) mixtures of the product of a polymerization of propylene in the first step and a random copolymerization of propylene and ethylene in the second step, each of which have been polymerized in the presence of Ziegler-Natta catalyst by sequentially passing propylene monomer, and then propylene/ethylene monomers over the catalyst consisting of:
30 to 90% by weight of propylene homopolymer portions as the first segment which have a molecular weight distribution of 5 or less as determined by gel permeation chromatography and an intrinsic viscosity of 0.85 to 0.95 dl/g as determined at 135° C. using tetralin as a solvent, and 10 to 70% by weight of propylene-ethylene random copolymer portions as the second segment (A') which have a calculated viscosity parameter $[\eta]_{EP}$ of 4.5 to 5.5 dl/g as defined above, and a weight ratio of the propylene units to the ethylene units of 75:25 to 60:40, and
a crystalline propylene homopolymer having a molecular weight distribution of 5 or less as determined by gel permeation chromatography and an intrinsic viscosity of 0.85 to 0.95 dl/g as determined at 135° C. using tetraline as a solvent, and in said component (A), the second segment (A') being contained in an amount of 3.3% by weight or more and less than 25% by weight based on the resin composition (D), said ethylene-butene-1 copolymer rubber (B) having a molecular weight distribution of 2.7 or less as determined by gel permeation chromatography, a content of butene-1 unit of from 15 to 20% by weight, an intrinsic viscosity of from 1.1 to 2.1 dl/g as determined at 70° C. using xylene as a solvent, and a Mooney viscosity at 100° C., $ML_{1+4}$ 100, of from 7 to 90, said ethylene-propylene copolymer rubber (C) having a molecular weight distribution of 2.7 or less as determined by gel permeation chromatography, a content of propylene unit of from 20 to 30% by weight, an intrinsic viscosity of from 1.8 to 2.2 dl/g as determined at 70° C. using xylene as a solvent, and a Mooney viscosity at 100° C., $ML_{1+4}$ 100, of from 35 to 100, said resin composition (D) satisfying the following mathematical expressions (1) to (5):

| | |
|---|---|
| $A+B+C=100$ | (1) |
| $B+C \leq 30$ | (2) |
| $0.3 \leq (A'+B+C)/100 < 0.55$ | (3) |
| $0.1 \leq A'/(A'+B+C)$ | (4) |
| $0.4 \leq B/(B+C) \leq 0.6$ | (5) | wherein A, B and C are the weight percentages of the crystalline polypropylene component (A), the ethylene-butene-1 copolymer rubber (B) and the ethylene-propylene copolymer rubber (C) in the resin composition (D), respectively; and A' is the weight percentage, based on the resin composition (D), of the second segment of the crystalline polypropylene component (A), said modified polypropylene (E) being obtained by graft copolymerizing, onto a polypropylene, monomers consisting of 0.01 to 10 parts by weight of an unsaturated aromatic monomer and 0.01 to 10 parts by weight of either an unsaturated carboxylic acid or a derivative thereof per 100 parts by weight of the polypropylene, said epoxy group-containing copolymer (G) being selected from the group consisting of:
(i) a copolymer of 99.9% to 50% by weight of an ethylenically unsaturated compound selected from the group consisting of:
(a) ethylene,
(b) vinyl acetate,
(c) methyl acrylate,
(d) ethyl acrylate,
(e) methyl methacrylate,
(f) vinyl chloride,
(g) vinylidene chloride, and
(h) isobutyl vinyl ether,
and 0.1% to 50% by weight of at least one unsaturated epoxy compound selected from the group consisting of:
(a) glycidyl acrylate,
(b) glycidyl methacrylate,
(c) glycidyl itaconate,
(d) allyl glycidyl ether,
(e) 2-methylallyl glycidyl ether, and (f) styrene p-glycidyl ether, and (ii) a terpolymer of 99.9% to 50% by weight of ethylene and at least one ethylenically unsaturated compound selected from the group consisting of (a) vinyl acetate and (b) methyl acrylate, and 0.1% to 50% by weight of at least one unsaturated epoxy compound as defined above, the mixture of the crystalline polypropylene component (A), the ethylene-butene-1 copolymer rubber (B), the ethylene-propylene copolymer rubber (C), the modified polypropylene (E), the saturated polyester resin (F) and the epoxy group-containing copolymer (G) having a melt flow rate, determined at 230° C. under a load of 2.16 kg using an orifice having a diameter of 2.095 mm and a length of 8.000 mm, of from 15 to 25 g/10 min. and a flexural modulus at 23° C. of from 3,000 to 25,000 kg/cm$^2$.

2. The thermoplastic resin composition of claim 1, which further comprises 1 to 22 parts by weight of talc (H) having an average particle size corresponding to 50% weight ($D_{50}$) in a cumulative size distribution curve of 4 μm or less, and the mixture of the crystalline polypropylene component (A), the ethylene-butene-1 copolymer rubber (B), the ethylene-propylene copolymer rubber (C), the modified polypropylene (E), the saturated polyester resin (F), the epoxy group-containing copolymer (G) and the talc (E) has a melt flow rate, determined at 230° C. under a load of 2.16 kg using an orifice having a diameter of 2.095 mm and a length of 8,000 mm, of from 15 to 25 g/10 min. and a flexural modulus at 23° C. of from 3,000 to 25,000 kg/cm$^2$.

3. An article obtained by injection molding the thermoplastic resin composition of claim 1.

4. An article obtained by injection molding the thermoplastic resin composition of claim 2.

* * * * *